United States Patent [19]

Schofield et al.

[11] Patent Number: 4,769,196

[45] Date of Patent: Sep. 6, 1988

[54] METHOD OF MANUFACTURE OF A NON METALLIC LAMINATE

[75] Inventors: Siobhan E. Schofield; John R. Fowler, both of Derby, England

[73] Assignee: Rolls-Royce plc, London, England

[21] Appl. No.: 673,093

[22] Filed: Nov. 19, 1984

[30] Foreign Application Priority Data

Dec. 21, 1983 [GB] United Kingdom ................. 8334087

[51] Int. Cl.⁴ .............................................. B32B 31/12
[52] U.S. Cl. ................................. 264/103; 106/18.11; 106/18.12; 264/135; 264/137
[58] Field of Search ......................... 106/18.11, 18.12; 264/103, 112, 113, 135, 137, 257, 258

[56] References Cited

U.S. PATENT DOCUMENTS

| | | | |
|---|---|---|---|
| 3,850,723 | 11/1974 | Ackley | 264/258 |
| 4,201,247 | 5/1980 | Shannon | 264/113 |
| 4,234,639 | 11/1980 | Graham | 106/18.12 |
| 4,269,800 | 5/1981 | Sommer et al. | 264/113 |

FOREIGN PATENT DOCUMENTS 1291939 10/1972 United Kingdom .

*Primary Examiner*—Jeffery Thurlow
*Attorney, Agent, or Firm*—Cushman, Darby & Cushman

[57] ABSTRACT

A rigid, non-metallic laminate suitable as a fire barrier, made by impregnating a layer of non-metallic fibers other than glass fibers with a resin, coating glass fibers with a refractory aluminum silicate to form a sheath, superimposing a layer of the thus alumina silicate coated glass fibers on the resin impregnated layer of non-metallic fibers and then subjecting the resulting laminate simultaneously to heat and pressure to squeeze resin from the non-metallic fibers into the interstices of the alumina silicate coated glass fibers and to cure the resin binder. A rigid multi-layer laminate in a common resin binder useful as a fire resistant panel or duct for a gas turbine engine results.

4 Claims, 1 Drawing Sheet

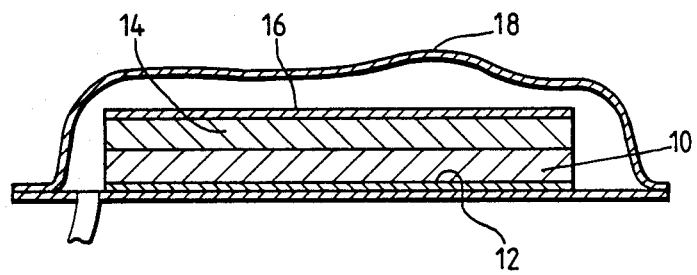

METHOD OF MANUFACTURE OF A NON METALLIC LAMINATE

BACKGROUND OF THE INVENTION

New lining materials have been devised, which have proved to be suitable substitutes for asbestos. The linings comprise glass fibres coated with a refractory alumino-silicate sheath.

The accepted manner of preparation of the substance for applying to a surface, is to make it into a cloth like strip for storage purpose, using a suitable binder and then immediately before application, spread an adhesive either on the strip or the surface of both and thereafter press the strip onto the surface. A three layer laminate is thus formed and consists of the base member which has the surface to which the strip is applied, the adhesive and the strip itself.

In environments where the new lining material is required to be used in order to make use of its fire retardent characteristics, but at the same time would be subjected to high dynamic loads e.g. in a gas flow duct made from a composite fibre material, particularly a jet engine gas flow duct, such methods of attachment as are described herein before are used, with the attendant risk of separation of the laminate.

The present invention seeks to provide an improved method of attachment of glass fibres which are coated with a refractory alumina-silicate sheath, to a non metallic fibre member.

BRIEF DESCRIPTION OF THE DRAWING.

The attached FIGURE is a representation of the alumina silicate coated glass fibers atop the binder resin filled non-metallic fibers in a vacuum assembly prior to heating, pressing and curing the binder resin.

According to the present invention a method of manufacturing a rigid, non metallic laminate including a fire barrier comprises the steps of impregnating a layer of non metallic fibres with resin, coating glass fibres with alumina silicate and superimposing a layer of the alumina silicate coated glass fibres on the resin impregnated layer of non metallic fibres and then subjecting the resulting laminate simultaneously to heat and pressure so as to effect both curing of the resin and squeezing of resin from the non metallic fibres into the interstices of the alumina silicate coated glass fibres so as to produce a rigid multi layer laminate in a common resin binder.

The method may include weaving the non metallic fibres prior to application of the resin.

The method may include simultaneous curing and squeezing of the resulting laminate in a mould so as to achieve a desired finished shape.

DESCRIPTION OF THE PREFERRED EMBODIMENTS

The invention will now be described by way of example and with reference to the accompanying drawing.

In the drawing, a desired thickness of fibres 10 which e.g. may be any of the materials carbon, glass and Kevlar, is impregnated with a resin of which epoxy and polyimide are but examples. The resin impregnated fibres 10 are then laid on a non porous, non adhesive sheet 12.

A desired thickness of glass fibres 14 which have been coated to give them fire resistant characteristics, are then laid over the resin impregnated fibres 10 and a further, non porous, non adhesive sheet 16 laid over the coated glass fibres 14.

The glass fibres 14 in the example, are coated with a refractory alumina-silicate.

The entire laminate is then placed in a vacuum bag 18 and is cured using temperature and pressure (e.g. in an autoclave) so as to force the resin from the resin pre-impregnated layers of fibres 10 into the interstices of the coated glass fibres 14.

When the resin is cured, there results an assembly which is rigid and self supporting and which, if not already the desired shape, may be cut to a desired shape. Moreover, the assembly has a fire retardent surface and is suitable for use in certain areas of a gas turbine engine. One example of such use is as disclosed in British Pat. No. 1,291,939 where the assembly of the present invention can be appropriately shaped and substituted for the fire resistant panel 28 shown therein. Another example is to form completely circular duct portions (not shown) for a gas turbine engine, in which the fire retardant layer will lie in the hot stream.

Other advantages which are gained by manufacturing the assembly as described herein, are as follows. Gas flow over the fire retardant layer 14 will not lift the layer from the woven fibre layer 10, as could easily happen if the fire retardant layer 14 was only glued thereto by a separate adhesive layer. A non-porous, thermally insulated structure is manufactured by this method which is resistant to the uptake of liquids e.g. solvents, oils and fuels by virtue of having a sealed surface.

It will be noted that no values are given regarding the temperature or time which should be utilised to effect curing of the resin. This is because suitable techniques are well known in the art and per se form no part of the inventive step in the present invention.

We claim:

1. A method of manufacturing a rigid, nonmetallic laminate including a fire barrier comprising the steps of:
   (a) impregnating a layer of nonmetallic fibers with a resin,
   (b) forming a layer of alumina silicate coated glass fibers,
   (c) superimposing said layer of alumina silicate coated glass fibers on the resin impregnated layer of nonmetallic fibers to form a laminate,
   (d) subjecting the said laminate simultaneously to heat and pressure, thereby squeezing resin from the layer of nonmetallic fibers into the interstices of the alumina silicate coated glass fibers and curing said resin so as to produce a rigid, multilayer laminate bonded with a common resin.

2. The method of claim 1 which includes weaving the nonmetallic fibers prior to impregnating said fibers with said resin in step (a).

3. The method of claim 1 wherein said laminate in step (d) is subjected simultaneously to heat and pressure in a mold so as to achieve a desired finished shape.

4. The method of claim 2 wherein said laminate in step (d) is subjected simultaneously to heat and pressure in a mold so as to achieve a desired finished shape.

* * * * *